United States Patent [19]

Stucke

[11] 4,161,320
[45] Jul. 17, 1979

[54] RESILIENT PACKING

[75] Inventor: Charles G. Stucke, Clarence, N.Y.

[73] Assignee: Chemprene, Inc., Alden, N.Y.

[21] Appl. No.: 809,869

[22] Filed: Jun. 24, 1977

Related U.S. Application Data

[63] Continuation of Ser. No. 357,966, May 7, 1973, abandoned.

[51] Int. Cl.$^2$ .............................................. F16J 15/32
[52] U.S. Cl. ...................................... 277/205; 277/29; 277/207 R
[58] Field of Search ............... 277/205, 206 R, 206 A, 277/207 R, 165, 29

[56] References Cited

U.S. PATENT DOCUMENTS

| 2,830,832 | 4/1958 | Moorman et al. | 277/29 |
| 3,167,323 | 1/1965 | Appleton et al. | 277/205 |
| 3,386,745 | 6/1968 | Hein | 277/205 X |
| 3,851,888 | 12/1974 | Limpson et al. | 277/165 X |
| 3,892,418 | 7/1975 | Felt | 277/205 |

FOREIGN PATENT DOCUMENTS

| 1055460 | 4/1959 | Fed. Rep. of Germany | 277/207 A |
| 1004557 | 9/1965 | United Kingdom | 277/207 |
| 1214986 | 12/1970 | United Kingdom | 277/205 |

*Primary Examiner*—Robert S. Ward, Jr.
*Attorney, Agent, or Firm*—Lockwood, Dewey, Alex & Cummings

[57] ABSTRACT

U-ring-type packing having an enlarged lip configuration to provide dynamic resiliency with reduced wear and friction characteristics.

5 Claims, 4 Drawing Figures

RESILIENT PACKING

This is a continuation of application Ser. No. 357,966, filed May 7, 1973, now abandoned.

BACKGROUND OF THE INVENTION

This invention relates to packing and particularly resilient U-ring type packing having a particular structured lip configuration which achieves a high degree of sealing with desirable wearing and friction characteristics.

Packing in the shape of an annular ring with a concentric recess or cavity on one surface is widely utilized as packing or sealing material for reciprocating rods, pistons, plungers, or cylinders driven by high pressure fluids. These concentrically recessed packing rings, conventionally described as U-rings, where the cross sectional contour of the cavity is U-shaped provide excellent automatic sealing in dynamic applications. Due to their geometrical shape and resilient nature, they are highly sensitive to pressure changes and insure a complete seal at raised operational pressures and quickly resume their initial or uncompressed shape or configuration under reduced pressures so as to maintain both friction and wear at a minimum.

While these ring shaped packings are of superior utility as packing-sealing material in a variety of dynamic applications, they nevertheless suffer from certain limitations or drawbacks which adversely inhibit their full desired utilization. Foremost of these are either a loss or leakage of the high pressure fluid past the packing and/or undesirable wear and friction characteristics at the surface in contact with the moving cylinder or piston. Generally, these disadvantages result from certain compromises made in the design and construction of the typical U-ring packers.

In operation under elevated pressure conditions the contact surfaces of the U-ring are forced securely against the stationary gland wall and the moving rod surface or the surface of the cylinder when used on a moving piston through the assistance of the high pressure fluid flowing into the U-shaped cavity of the ring. Under low pressure conditions the sealing is primarily achieved through the resiliency and configuration of the U-ring which force the contact surfaces expansively against the rod or the cylinder and gland wall to prevent leakage of the high pressure hydraulic or pneumatic fluid. Typically, such sealing and resiliency is provided by fabricating the U-ring of resilient material and extending the leg-lip portions of the ring upwardly and outwardly which, upon compression within the gland, attempt to resume their original or uncompressed shape and force outwardly against the rod or cylinder and gland wall. Under normal operation, the resiliency of the leg-lip portions tends to deteriorate after a period of time so that poor sealing is achieved particularly under low pressure operation.

To eliminate this deterioration and to maintain the desired sealing, various techniques have been employed. One conventional procedure involves inserting a separate elastomeric element for example an O-ring into the U-shaped cavity which, upon compression within the gland, increases the pressure on the legs or sealing lips so as to force them outwardly against the gland wall and rod surface to achieve the desired sealing. This separate elastomeric element however, fills a portion of the U-shaped cavity, thereby, reducing the amount of fluid introduced into the cavity under high pressure conditions, and tends, under low pressure conditions, to create an excessively high pressure on the sealing lips resulting in poor wear characteristics and undesirable friction. Another conventional means employed to improve the U-ring sealing characteristics under low pressure operation involves placing a mechanical device such as a spring within the U-shaped cavity to force the legs of the U-ring outwardly apart and thus achieve the desired sealing. These mechanical devices, however, have a tendency of becoming quickly fouled by the high pressure fluid and their useful life is generally very short.

Accordingly, an object of this invention is to provide an improved U-ring packing having desirable sealing properties over the entire operating pressure range with desirable wear and friction characteristics. Another object is to provide such U-ring packing with a lip configuration or structure which provides desirable resilient sealing while simultaneously maintaining the desired U-shaped cross sectional contour of the cavity. A further object is to provide a U-packing having such sealing characteristics which does not require or utilize separate elements within the cavity. These and other objects of this invention will be apparent from the following further detailed description thereof, together with the attached drawings.

IN THE DRAWINGS

Figure 1:
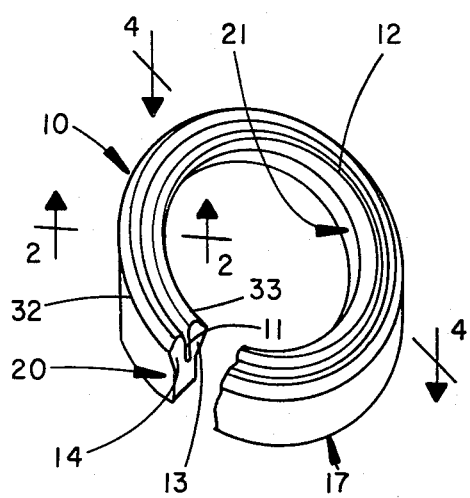
FIG. 1 is a perspective view of the packing of this invention with sections broken away illustrating the annular U-ring configuration.
Figure 2:
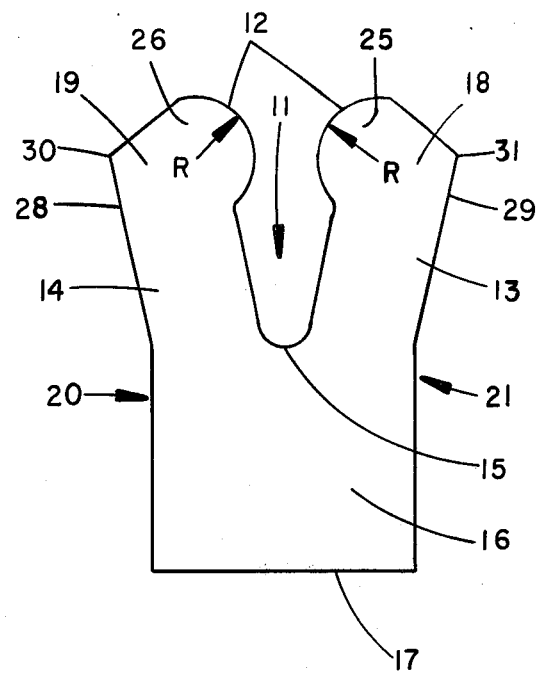
FIG. 2 is a section of the U-ring taken along line 2—2 of FIG. 1 but in a larger scale showing the cavity and lip arrangement of the packing ring.

Referring to FIGS. 1 and 2, the packing of this invention is illustrated in a preferred form as a unitary or one piece, annular ring 10 having a concentric groove or cavity 11 extending annularly on and inwardly from an outer or top surface 12. The cavity 11 is generally U-shaped in cross section as best illustrated in FIG. 2 and is bounded or defined by leg portions 13 and 14 which extend outwardly and upwardly from the bottom curved surface 15 of the cavity 11. Such bottom surface 15 is typically located at the upper region of the base 16 which is generally rectangular in cross section and typically has a flat surface or bottom 17. The leg portions 13 and 14 terminate in enlarged lip sections 18 and 19, respectively, the function and operation of which will be fully explained hereinafter. The side walls 20 and 21 typically form usually at some upper portions thereof the contact or sealing surfaces for the ring packing 10.

Figure 3:
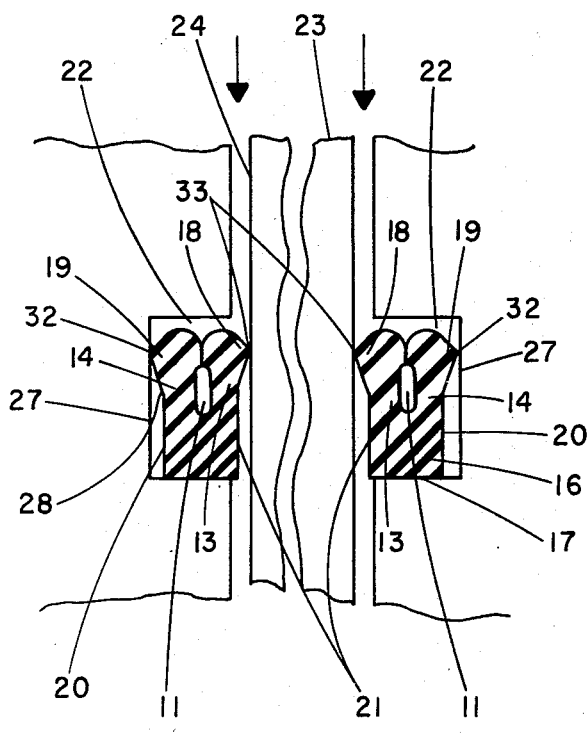
FIG. 3 is a sectional view illustrating the packing ring of FIG. 1 in place and compressed within a gland about a moving rod.

In operation, and as best illustrated by reference to FIGS. 2 and 3 the ring packing 10 is usually positioned either with or without a metal adapter (not shown) within a gland chamber 22 typically of fixed dimensions maintained about a reciprocating, annular rod 23. The inside diameter, side wall 21 is in sealing contact the surface 24 of the rod 23 and the outside diameter, side wall 20 also acts as a sealing surface in contact with the backwall 27 of the gland chamber 22. As previously discussed, U-ring packing operates in its sealing function by allowing the fluid under high pressure condition as shown by the arrows of FIG. 3 to flow into the cavity 11 thus serving to assist in forcing the legs 14 and 13 apart and thus into sealing contact with the wall 27 of the gland 22 and the surface of the rod 24, respectively. Under low pressure condition, the normal resiliency of the seal 10, compressed within the gland 22, forces the legs 13 and 14, outwardly and into the desired sealing relationship.

In accordance with this invention this sealing arrangement is greatly enhanced through the employment of the enlarged lip sections 18 and 19 located at the terminals of the leg portions 13 and 14, respectively.

When the packing ring 10 is inserted into the gland 22 adjacent the rod surface 24, as shown in FIG. 3, it is radially compressed inwardly so that the enlarged lip sections 18 and 19 meet and mate under compression. However, because the lip sections 18 and 19 are enlarged with respect to the radial thickness of the leg portions 13 and 14, the lip sections 18 and 19, although compressed, nevertheless allow the generally desired U-shaped cross sectional contour of the cavity 11 to be preserved so that the cavity 11 can still serve its important function as a reservoir for the high pressure fluid. Moreover and most importantly, compression of the lip sections, 18 and 19 within the gland 22 while preserving the desired U-shaped configuration for the cavity 11 also and simultaneously serves to provide an outwardly force upon the lip sections 18 and 19 resulting from the resilient compression. This tends to force the legs 13 and 14 apart to achieve the desired sealing arrangement, particularly under low pressure conditions. This resiliency provided by the compressed lip sections 18 and 19 further serves to add a spring like function to the ring 10 thus providing greater dynamic resiliency to adjust for any eccentricity of the rod 23.

In order that the enlarged lip sections 18 and 19 of the ring packing 10 of this invention may properly function, the ring 10 and especially the enlarged lip sections 18 and 19 should be fabricated of a resilient material. Generally most rubbery elastomers conventionally used in sealing rings may be suitably employed with any particular material selected being a function of the particular sealing application intended. Typically, natural or synthetic rubbers such as homopolymers or copolymers of butadiene, isoprene and similar aliphatic conjugated diolefin hydrocarbons such as butadiene-styrene copolymer rubber or nitrile rubbers may be suitably employed with other elastomeric polymers such as urethanes being particularly preferred.

In serving their unique function of providing resilient compression while preserving the general U-shaped contour of the cavity 11, the lip sections 18 and 19 are preferably designed with projecting portions 25 and 26, respectively, which extend inwardly towards each other and over the cavity 11. Moreover, so that this desired resiliency is achieved for the lip sections 18 and 19 without undue wear or friction characteristics, the projecting portions 25 and 26 of the lip sections 18 and 19 respectively preferably have a curved surface which in cross section forms the arc of a circle having the radius R. Thus when mating under compression, the wear and friction between the mating projections 25 and 26 will be at a minimum, and yet provide maximum resiliency. In preferred operation the projecting portions 25 and 26 should each extend inwardly towards each other a distance sufficient so that upon radial compression of the ring packing 10 within the gland 22 the U-shaped configuration of the cavity will be substantially preserved and simultaneously a sufficient resilient force created to urge the legs 13 and 14 outwardly to provide the desired sealing relationship without producing excessive wear or friction on the packing.

This distance for the extended projecting portions 25 and 26 of the lip sections 18 and 19 respectively, will, of course vary depending upon the particular type of resilient material chosen for the ring 10 as well as the intended sealing application and environment. Generally, however, when employing a material such as urethane for the packing ring 10 the projecting portions 25 and 26 of the lip sections 18 and 19 respectively should extend inwardly a distance sufficient so that upon suitable compression within the gland 22 the projecting portions 25 and 26 upon mating are each compressed a distance equal to approximately about 8 to about 30 percent of the radius R of a circle having an arc corresponding to the cross sectional arc of the curved surface of the projecting portions 25 and 26. A more limited range is preferred however and to insure desirable sealing with minimum wear and friction characteristics the distance extended should be such that upon compression the projecting portions 25 and 26 are compressed a distance equal to approximately from about 15 to about 18 percent of the radius R.

In a preferred embodiment the maximum benefit of the enlarged lip sections 18 and 19 in sealing is achieved when the side walls 20 and 21 are so designed that the upper portions of such walls in the region of the enlarged lip sections 18 and 19 generally form convex surfaces 28 and 29 which are generally conical in cross section and generally terminate in apexes 30 and 31 which form circumferential ridges 32 and 33 which constitute the contact sealing surfaces for the ring 10 (FIG. 1). These convex surfaces 28 and 29 together with ridges 32 and 33 serve and cooperate together with the enlarged lip sections 18 and 19 to provide highly efficient sealing under both high and low pressure conditions.

Figure 4:
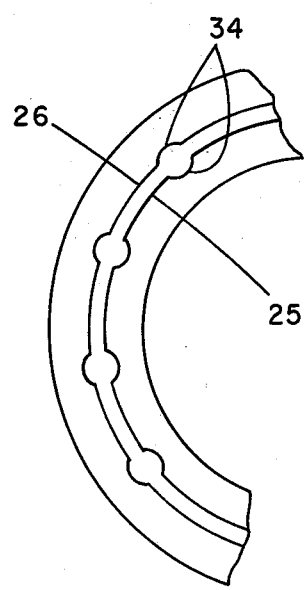
FIG. 4 is an exaggerated top view of a portion of the ring of FIG. 1 bonded by line 4—4 showing grooves on the interior surfaces of the lip sections of the ring packing.

In another particularly preferred embodiment, a series of grooves 34 as illustrated in FIG. 4 are provided on the surfaces of the projecting portions 25 and 26 of the lip sections 18 and 19 respectively. These grooves 34 are spaced circumferentially around the projecting portions 25 and 26 and extend downwardly or axially along the surfaces of such projecting portions. When the lip sections 18 and 19 mate and are compressed the grooves 34 serve to create aperatures or channels (not shown) providing fluid communication between the cavity 11 and the exterior of the packing 10 so as to allow the high pressure fluid to flow into the cavity 11. Advantageously, and in a preferred embodiment, the series of grooves 34 on the projecting portion 25 is in registry with the series of grooves on the projecting portion 26. Thus when the lip sections 18 and 19 are compressed together the series of grooves 34 mate together to form the aperatures or channels (not shown) therebetween for introducing high pressure fluid into the cavity 11. The number of grooves 34 on the projecting portions 25 and 26 can, of course, be widely varied and can be as few as one groove 34 so as to create one aperature channel.

The ring packing 10 of this invention can be prepared in a variety of different procedures and generally any of the conventional procedures such as compression or injecting molding used to prepare resilient ring packing from elastomeric material may be suitably employed.

Advantageously however, when using materials such as urethane, injection molding techniques are preferred for ease and economy of preparation. When so prepared, the dimensions and relative proportions of the packing ring 10 can be widely varied. For example, the angle that the legs 13 and 14 make with the base 16 and their radial thickness and length as well as the height of the base 16 can all be varied. Generally, however, the particular dimensions employed will be a function of the particular resilient material selected for the ring 10 as well as the type of sealing application intended.

I claim:

1. A resilient packing having a unitary body of a generally ring configuration about an axis, said body including a cavity of a generally U-shaped cross-sectional contour extending annularly on and inwardly from an outer surface of the packing and defined by upwardly and outwardly extending leg portions which each terminate in enlarged lip sections which mate upon radial compression of the packing to preserve the generally U-shaped cross-sectional contour of the cavity and to create an outwardly, expansive force on the lip sections by virtue of such compression which insures a positive sealing force for such ring wherein each enlarged lip section has a projecting portion extending inwardly, said projecting portions of each lip section having a curved surface which in cross-section forms the arc of a circle the radius of which is such that upon compression of the mating lip sections, the projecting portions are each compressed inwardly, a distance equal to from about 8 to about 30 percent of such radius, said lip sections including a convex portion extending outwardly and forming the contact sealing surfaces for the packing, said convex portion in cross-section being conical and terminating in an apex which forms a circumferential ridge constituting the sealing contact surface for the lip section, said apex being generally radially in line with said inwardly extending projecting portion of each enlarged lip section, whereby said circumferential ridge is in direct compression loading with the curved surfaces of said lip sections, said direct compression loading including compression along a generally radial straight line between an approximate midpoint of said curved surface and said circumferential ridge.

2. The packing of claim 1 wherein the distance each projecting portion is compressed inwardly is equal to from about 15 to about 18 percent of the radius.

3. The packing of claim 1 wherein the surface opposite the surface having the U-shaped cavity is substantially flat.

4. The packing of claim 1 wherein the enlarged lip sections having a plurality of grooves on their interior surface extending axially downwardly so that upon mating of the lip sections a plurality of channel-apertures are formed to provide fluid communication between the U-shaped cavity and the exterior of the packing.

5. The packing of claim 4 wherein the grooves are arranged on the two lip sections so that a pair of such grooves register upon mating of the lip sections to define an aperture-channel therebetween.

* * * * *